United States Patent Office 3,374,351
Patented Mar. 19, 1968

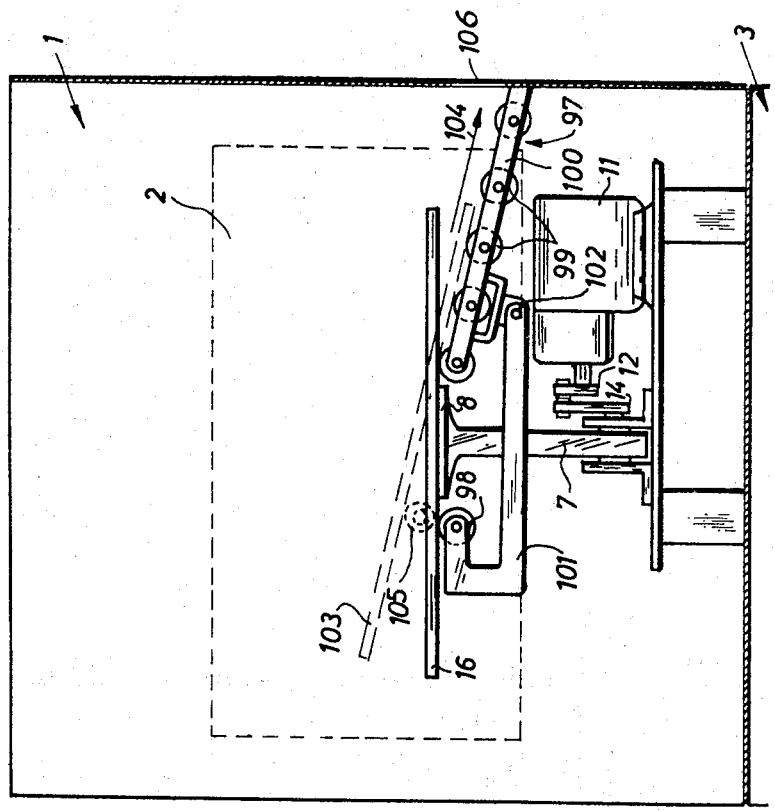

3,374,351
APPARATUS FOR AUTOMATICALLY HANDLING FILM SHEET CASSETTES
Karel Marcel Sano, Borsbeek, and Jan Alfons Stoop, Schilde, Belgium, assignors to Gevaert Photo-Producten N.V., Mortsel, Belgium, a Belgian company
Filed Oct. 14, 1964, Ser. No. 403,710
Claims priority, application Netherlands, Oct. 15, 1963, 299,222
8 Claims. (Cl. 250—66)

The present invention relates to a device for automatically handling film sheet cassettes. More particularly the present invention relates to a device for automatically handling film sheet cassettes containing exposed radiographic film sheets, in which device the cassettes can be placed in one definite way and which device transports the cassettes one after another into a light-tight housing in which the operations such as unloading or unloading and reloading the cassette are performed.

Apparatus for automatically supplying film sheet cassettes is already known in the art.

In our United States Patent No. 3,111,585 an apparatus has been disclosed comprising a compartment provided with an opening in which compartment an unloading mechanism is mounted, and a magazine located outside the compartment but within reach of the unloading mechanism, said magazine being divided into a number of sections each of them provided with an opening at its opposite sides and constructed to contain one cassette, and said magazine while displacing operates to bring each section separately with one of its openings in front of the opening of the compartment.

As main advantages of this apparatus may be cited that the operator is permitted to put a plurality of cassettes into the apparatus which are subsequently unloaded automatically and that due to the rapid sequence of handling film sheets the efficiency of the developing device arranged behind the unloading mechanism is considerably increased compared to apparatus having no such magazine.

The magazine for automatically supplying the cassettes in said apparatus, however, shows some disadvantages.

First, there is the uncertain positioning of the differently sized cassettes in the sections of the magazine. These sections are defined by partitions showing a step-like mounting profile towards both sides, each pair of correspondingly located steps serving for the guidance of one distinct size of cassette. Practice has proved that a cassette can be too readily positioned obliquely or otherwise not far enough into the section, so that the mechanism for opening the cassette and removing the film sheet remains inoperative.

Another disadvantage of this magazine is shown by its great dimensions, e.g. for a defined apparatus with a capacity of only ten X-ray film sheet cassettes of max. 40 x 40 cm. its dimensions amount to 740 x 500 x 1760 cm.

Due to the actual tendency towards decentralization, particularly in great medical institutes, there is a growing need for compact and handy apparatus which can be installed in relatively small rooms.

This apparatus has still the further disadvantage that no means are provided which prevent cassettes from being placed into the magazine in an erroneously oriented way. It is possible to place the cassettes back to front or upside down into the sections. Although such erroneously placed cassettes do not cause any damage to the apparatus and will automatically be detected by a warning system incorporated in the apparatus, they interrupt the normal sequence in the operation of the apparatus and thus involve a loss of time.

As a final disadvantage of said apparatus, no means are provided for the removal of the cassettes after they have been unloaded.

The object of the present invention is to provide a device for automatically supplying film sheet cassettes which does not show the disadvantages of the above-mentioned apparatus and moreover which is compact and simple in construction.

According to the present invention the device for automatically supplying film sheet cassettes, in particular for automatically supplying radiographic film sheet cassettes, comprises a plurality of hooks each arranged to carry one cassette, means for displacing the hooks rectilinearly in a horizontal or almost horizonttal direction and making the hooks return at the end of this course to the beginning of said course, means for seizing the cassettes at the end of the course, lifting them from their hooks and bringing the cassettes accurately to a predetermined position, irrespective of their dimensions, which is suited for a further treatment of the cassettes.

Referring to the accompanying drawings, the device according to the present invention will now be described by way of an exemplary embodiment.

FIG. 7 is a simplified back view of the device.

FIG. 1 represents a device for automatically unloading cassettes containing exposed radiographic film sheets and reloading these cassettes with unexposed radiographic film sheets.

It comprises the light-tight housing 1 placed on a second light-tight housing 3, and the supply device 5 being connected to the housing 1.

This housing 1 contains systems for removing the cassettes from the supply device 5, means for opening and closing, and unloading and loading, the cassettes, and for ejecting the loaded cassettes.

In housing 3 are located holders containing the unexposed film sheets which are transported by the loading system to the unloaded cassettes. These holders are not represented in this figure because they are not necessary for the understanding of the embodiment.

Figure 6:
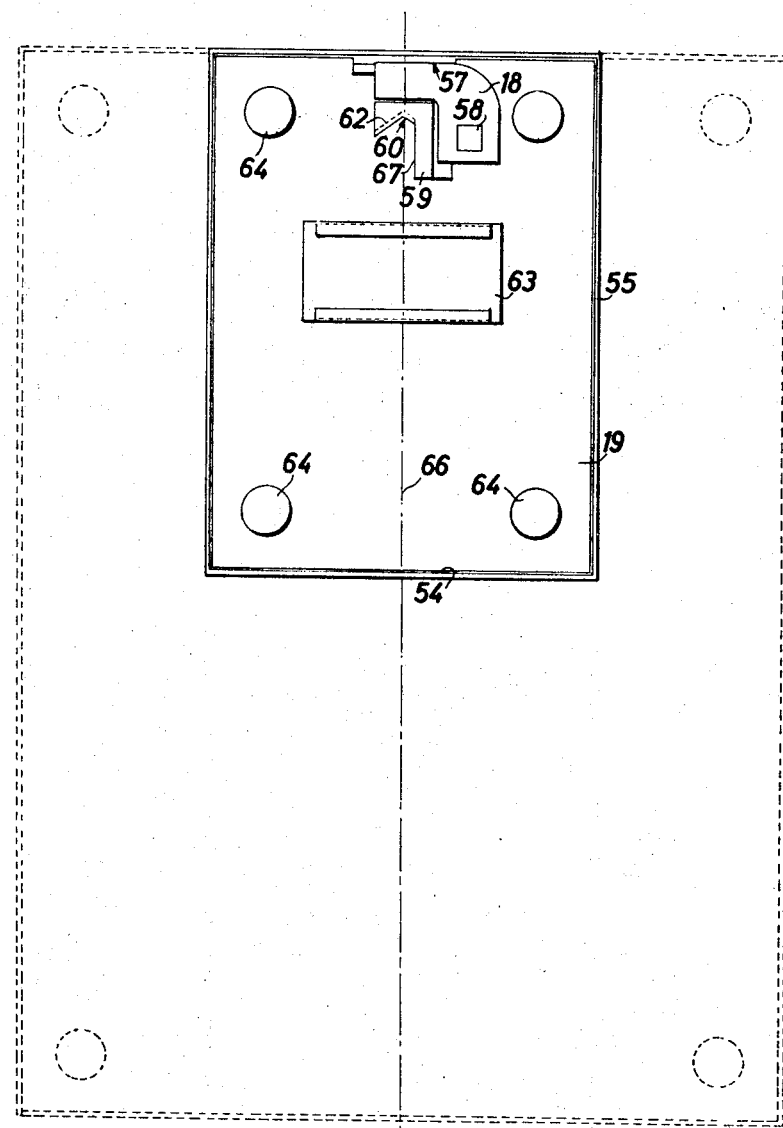
FIG. 6 is a front view of two cassettes.

The device is appropriate for unloading cassettes containing film sheets with the following standard sizes: 130 x 180 mm., 180 x 240 mm., 240 x 300 mm., 300 x 400 mm., 356 x 356 mm., 14″ x 17″ and 150 x 400 mm. In FIG. 6 the cassette for the film sheet size of 130 x 180 mm. is indicated in full lines and the periphery of the cassette for the film size 300 x 400 mm. is represented in broken lines. For the sake of simplicity the smallest type of casette, viz. the one in use for film sheets of 130 x 180 mm., will be dealt with in the folowing description of the supply device.

The supplying device 5 is connected to the housing 1 by the wall 4.

Figure 2:
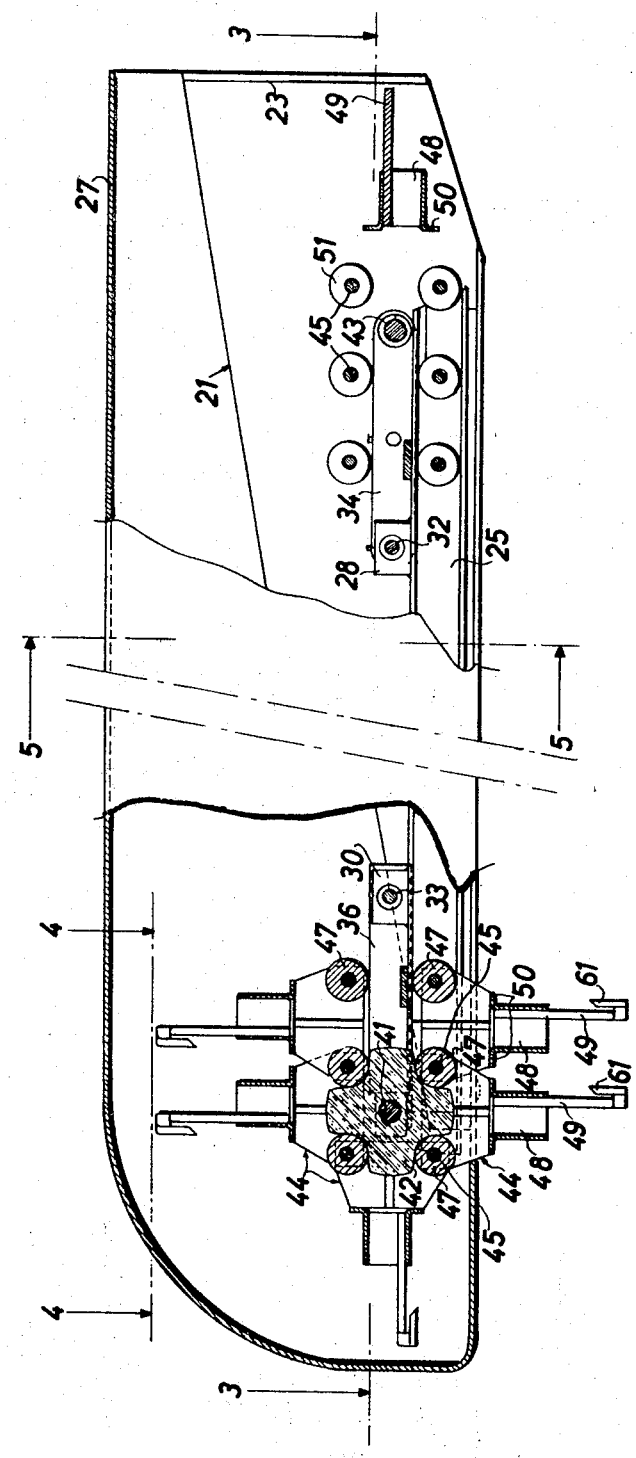
FIG. 2 is in part a cut open side view of the device on line 2—2 of FIG. 3.
Figure 3:
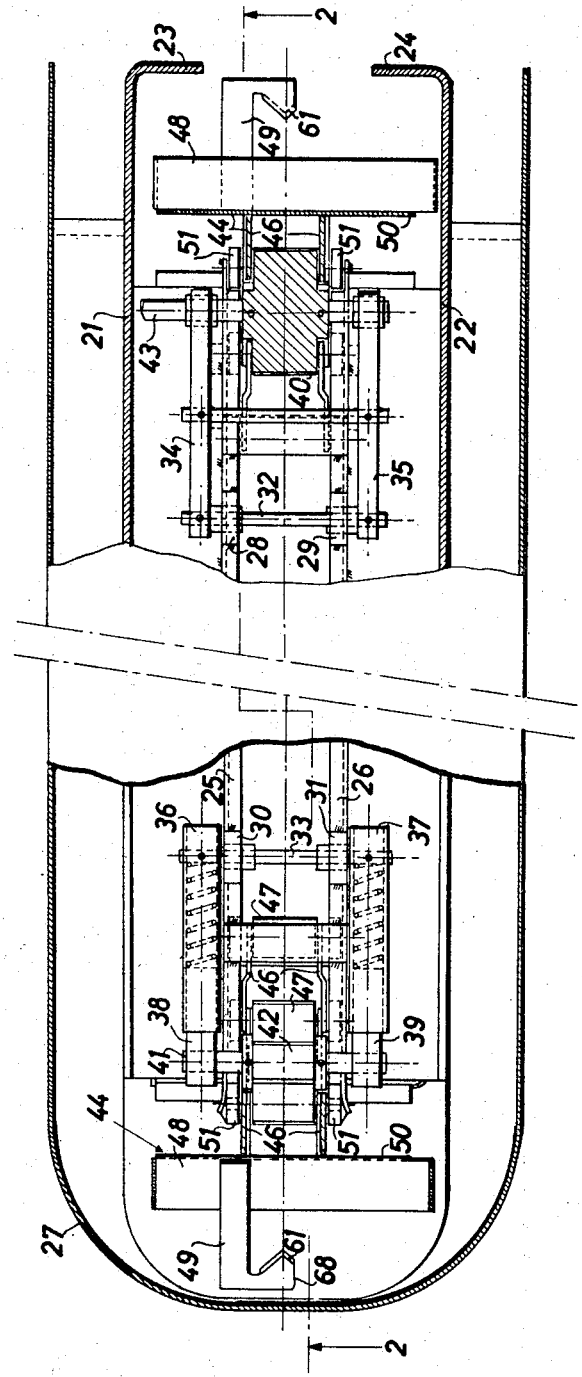
FIG. 3 is a longitudinal section on line 3—3 of FIG. 2.

It is supported by the L-shaped longitudinal beams 21, 22 which are attached to the wall 4 by means of the hooked ends 23, 24 (FIGS. 2, 3). The beams are surrounded by the cover 27.

Each longitudinal beam supports a U-shaped rail 25, 26. On these rails the bearings 28, 29, 30, 31 are provided near the ends thereof in which the shafts 32, 33 are journalled.

To the shaft 32 are linked the arms 34, 35 which support the shaft 43 of the cog wheel 40. To the shaft 33 the bushings 36, 37 are fixed containing each a spring which pushes outwardly on the rods 38, 39 fitted slidingly in the bushings and bearing the shaft 41. Thereby the cog wheel 42 mounted rotatably on the shaft 41 is pushed outwardly and the chain is maintained tightened.

The chain is driven by means of the shaft 43 which is coupled to the reduction gear of a motor (not represented).

The chain which is tightened over both chain or cog wheels 40 and 42 is composed of the links 44 mutually connected to each other by the connecting pins 45 (FIG. 2). Each link 44 consists of two Z-bent (FIG. 3) trapezoidal (FIG. 2) plates 46, a transverse guide element 48 welded to said plates, and the hooked portion 49 with pointed end 61 which is provided with slanting edges.

Figure 4:
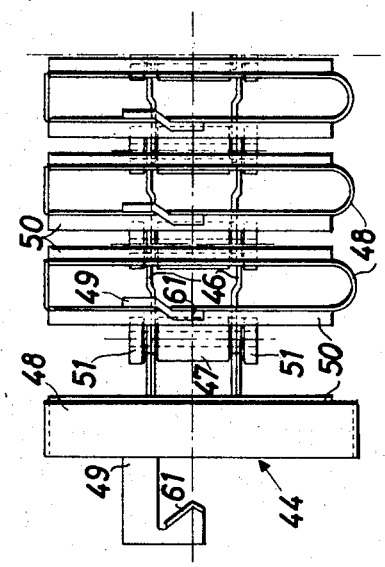
FIG. 4 is a top view of the supply chain on line 4—4 of FIG. 2.

Each welded guide element 48 is in the form of a closed U directed transversally with respect to the longitudinal direction of the chain, and has two flat bottom edges 50 (FIG. 4).

Figure 5:
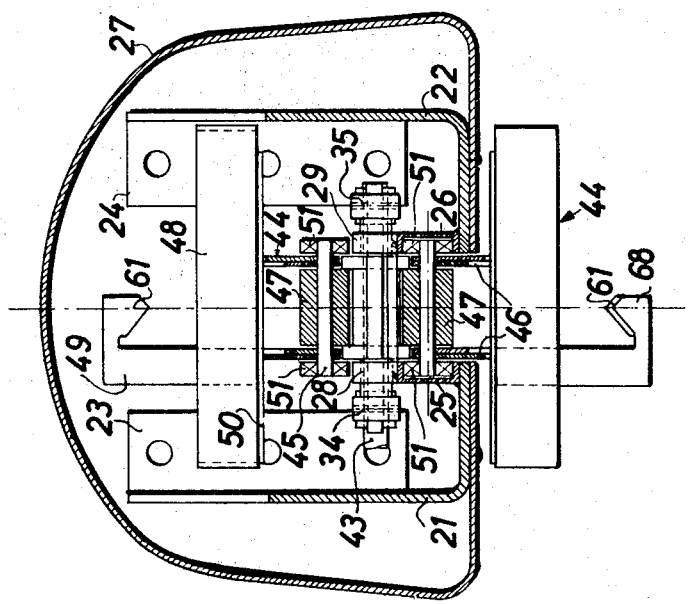
FIG. 5 is a cross-section of the device on line 5—5 of FIG. 2.

Each of the connecting pins 45 is provided with a roller 47 in the center and a small roller 51 in the form of a ball bearing at either side (FIG. 5). The rollers 51 of the lower chain half are guided by the U-shaped rails 25, 26 which make this lower chain-half follow a rectilinear course. The upper chain half is guided by a guide member, not represented in the drawings, which is mounted between the shafts 32 and 33, and over which travel the roller 47 of the chain. During the run of the chain, the chain or cog wheels 40 and 42 will perform a pivoting movement in the vertical direction around the shafts 32 and 33. Said movement is imparted by the small rollers 51 which follow a rectilinear course at the inside of the U-shaped rails until they reach positions under the shaft of the respective chain wheels, as a consequence whereof, they will push the shaft of the chain wheel upwardly a distance which is equal to the maximum height (sagetta) between arc and chord on the pitch circle of the chain wheel, comprised between two successive teeth or cogs of the chain wheel.

During this movement the compression springs in the bushings 36 and 37 ensure the tightening of the chain.

The cassettes (FIG. 6) treated by the supply device comprise a lid 19, which is connected by a hinge 54 to the cassette frame 55. The lid 19 is kept closed by means of the lock member 18. This lock member is L-shaped and is attached hingedly to the lid by its side portion 57. An opening 58 in the lock member 18 provides for the unlocking of the cassette by means of a hook so that the cassette can be opened.

Next to the lock member 18, the cassette lid bears a small plate 59 provided with a recess 60 which fits over the hooks 61 of the supply device. Moreover it has been obliquely milled as indicated by the broken line 62, so that the recess 60 with its sloping faces fits close onto the sloping faces of the hooks 61.

On the lid of the cassette a holder 63 has been attached in which a ticket with identification data relating to the recorded image can be inserted.

Finally, the cassette lid is provided with 4 elevational portions 64 which enable the cassettes to be stacked on each other without the risk that the holder 63 intended for the identification data, or the lock member 18 and the plate 59, will be touched by the superposed cassettes.

The lock member 18 and the plate 59 are located at the same distance from the upper rim of the casette and are always positioned in the same way with respect to the center line 66 of each cassette. Consequently the upper side and the lock member thereon of all cassettes are situated at the same level as appears clearly from FIG. 1, and moreover the center lines of all cassettes lie in one plane.

In the following description the side of the cassette provided with the lid will be called the front side and the rear side of the cassette will be referred to as the back side.

Figure 1:
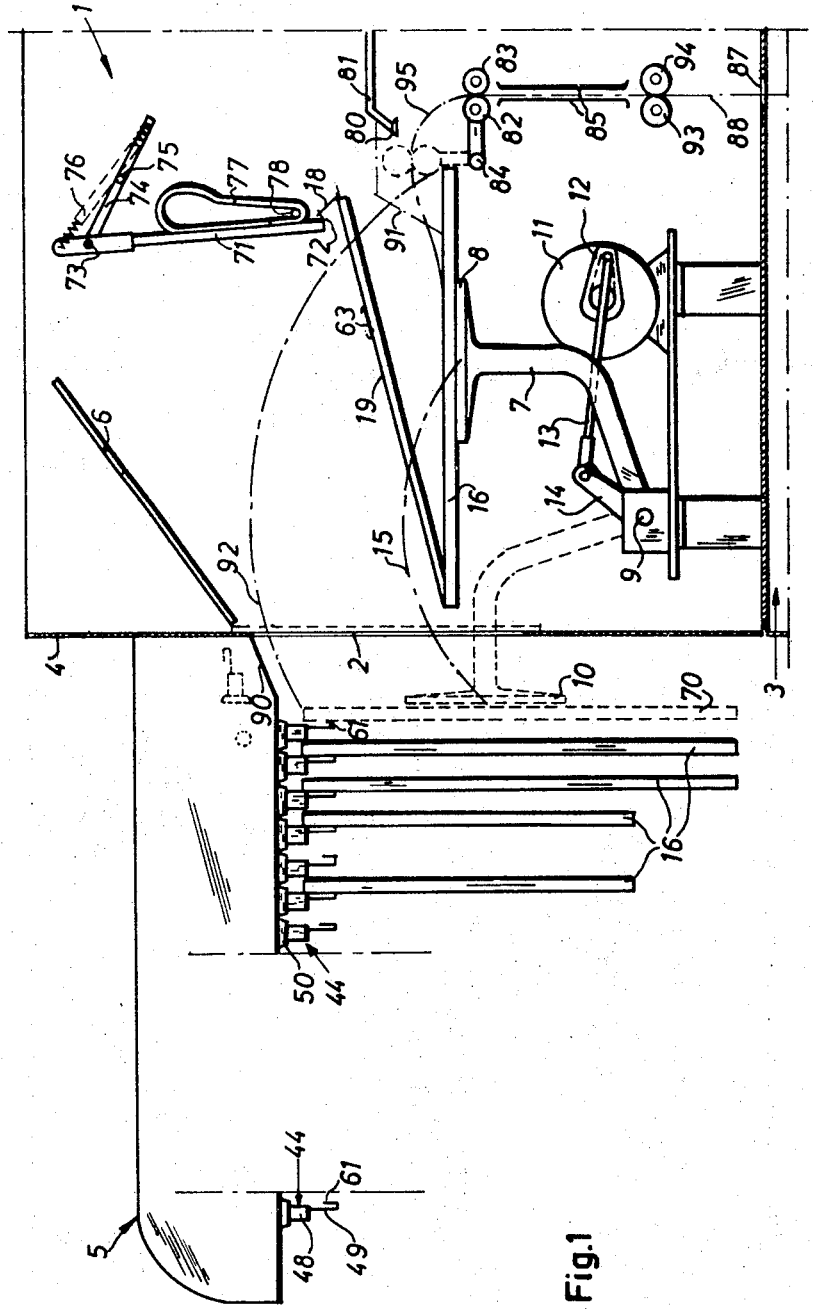
FIG. 1 is a diagrammatic side view of the device according to the present invention.

The front wall 4 of the light-tight housing 1 represented in FIG. 1 has an opening 2 which can be closed light-tight by the shutter 6. This shutter 6 can be displaced by means of a set of levers (not represented in the figure) from a closed position represented in broken lines into an open position represented in solid lines.

The gripping system of the housing 1 for removing the cassettes 16 from the supply device 5 when reaching the position 70, consists of a lever 7 which is provided with a suction member 8 and is fixed to the shaft 9 (FIG. 1).

The lever 7 performs a swinging movement over almost 90° thereby displacing the suction member 8 from the position drawn in full lines over a course 15 indicated by a dash and dot line to the position 10 indicated in broken lines. This swinging movement is controlled by the motor 11 provided with a reduction gear. The motor 11 is connected to the crank 14 by means of the crank 12 and the arm 13. The crank 14 is secured to the shaft 9 carying the lever 7.

The suction member 8 is arranged to seize a cassette 16 at its back-side in the position 70 and to bring this cassette into the housing 1 in an almost horizontal position as shown in the figure.

The system for opening and closing the cassette in housing 1 comprises the arm 71 which is capable of gripping the lock member 18 on the lid 19 of the cassette by means of the hook 72. The arm 71 is rotatably attached to the arm 74 at point 73. This arm 74 is connected to a shaft 75 and is capable of rotating to the left and to the right over about 180°. A tension spring 76 makes the cam 77 slide over the stationary pin 78 during the upward and downward movement of the arm 71.

The cassette is closed when the arm 74 performs a rotational movement to the left (anti-clockwise direction). The arm 71 first moves downwardly and the hook 72 under the influence of the movement imparted by the cam 77 to the arm 71 will follow a course thereby first closing the lid 19 of the cassette, and is then released from the under side of the lock member 18 and is drawn away therefrom so that the lock member under the influence of spring means can close, and then moves upwardly again until it takes its inoperative position. In this position the hook 72 and the arm 71 are outside the course 92, indicated in a dash and dot line, followed by the cassette when it is introduced into the housing 1. The operation of opening a cassette is done in reversed order until the mechanism takes a position as indicated in the figure, The system for unloading the cassette comprises a mechanism (not shown in the figure) which brings the suction member 80 fitted on the arm 81 into the opened cassette over the course 91 for seizing the film sheet, and lifting and removing same until it enters between the roller pairs which carry the film sheet to the processing device.

The system for loading the cassette comprises a driven roller pair 82, 83 capable of swinging around the shaft 84, the guide plates 85 and the roller pair 93, 94. The unexposed film sheets are transported from the film sheet containers in the housing 3 into the housing 1 through the opening 87 over the course 88. A mechanism is provided for selecting sheets from the differently sized film sheets in the containers of the housing 3, in order to provide the unloaded cassette in the housing 1 with a film sheet of the corresponding size. An example of such selecting mechanism is described in our Belgian patent specification 618,236 in which a selecting mechanism is disclosed, comprising a movable element which is arranged close to the cassette holder and which is brought into a given position by the cassette to be loaded, a selecting mechanism being controlled by said movable element and comprising a detection means, an indicator means for each loader containing a stack of fresh film sheets of a given size, the location of said indicator means being detected by the detection means, so that during the relative displacement of the loaders with fresh film sheets and the loading device, the various indicator means move along the detection means, the relative movement of the loaders with fresh film sheets and the loading mechanism being stopped and the loading cycle being started when the indicator means of the stack of film sheets, the size of which corresponds to the cassette to be loaded, is positioned in front of the detection means.

The operation of the apparatus will now be described briefly.

The cassette to be unloaded is hung by the operator on a hook of the supply device (FIG. 1). This operation is facilitated by the guide elements 48 which make the cassette move in a direction perpendicular to the longitudinal direction of the chain. The operator holds the cassette sufficiently high so that it slides with its upper rim along the flat edges 50. When the edge portion 67 of the small plate 59 of the cassette (FIG. 6) abuts against the edge portion 68 of the hook 61 (FIGS. 3-5) the cassette cannot be displaced further in the transverse direction. Next the operator lowers the cassette and the recess 60 slides over the hook 61. Any risk whatever that the cassette can pass beyond the hook 61 or hang only partly or obliquely therefrom is excluded. The step of hooking on the cassettes in the exact way is very simple and can be executed by unskilled employees after some practice.

The chain of the supply device 5 moves at a uniform speed until the moment as cassette takes a position as shown by the broken lines 70 in FIG. 1. A microswitch which is operated by the cassette in said position, actuates a system which controls the gripping mechanism.

The mechanism for controlling the shutter 6 starts to operate and lifts the shutter up from the closed position, indicated in broken lines, into the opened position, indicated in full lines.

The motor 11 starts running and displaces the lever 7 through the opening 2 in the wall 4 until the suction member 8 takes a position as indicated in broken lines. The suction member closely contacts the back-side of the cassette, a vacuum is created in the suction member, and the lever 7 returns to its original position. The cassette is thereby lifted from the hook 61 over a course in the form of an arc of a circle, the centre of which coincides with the axis of shaft 9. The course of the starting movement at the hook 61 is practically parallel to the slope of the inclined sides of the hook 61 and to the bevelled portion of the recess 60 of the plate 59 on the cassette. Thereby the cassette is slidingly removed from the hook 61. It has to be noticed that due to the fact that the chain or cog wheel 40 is only provided with four teeth, the hook immediately before the one which hooks off the cassette, takes a horizontal position (FIGS. 1 and 2) so that it does not hinder the step of removing the cassette. The end 90 of the supply device close to the housing 1 has also a slanting profile so that the removing of the cassette will not be hindered either.

The cassette is firmly held by the suction member 8 and finally takes an almost horizontal position in the housing 1, its back-side turned downwardly. The shutter 6 is closed again and the chain starts moving again until a following cassette takes the position indicated in the broken lines 70.

The mechanism controlling the hook 72 starts operating and opens the cassette. The suction member 80 enters the opened cassette, seizes and removes the exposed film sheet over the course 91, and introduces same between roller pairs which guide it to the processing device. As soon as the film sheet has left the cassette the roller pairs 82, 83 and 93, 94 start rotating. The right sized unexposed film sheet, which was supplied from the housing 3 over the course 88, is now brought into the opened cassette over the curved course 95. This path can be realised due to the fact that the rollers 82, 83 perform a rotating and swinging movement around the shaft 84, so that by taking a vertical position as indicated by a broken line, these rollers guide the film sheet towards the opened cassette and the film sheet is delivered therein. When the film sheet has left the rollers 82, 83 in their vertical position, these rollers return to the horizontal position, the lid 19 of the cassette is closed and the vacuum in the suction member 8 is removed.

As a consequence of the removal of the vacuum in the suction member 8 the cassette becomes ejected. This operation is illustrated in FIG. 7 which shows a simplified back view of the device.

Referring to FIG. 1, FIG. 7 illustrates the system for removing the cassettes from the hooks through the opening 2 in the wall 4, as well as the roller set 97 and the displaceable roller 98, which have been omitted in FIG. 1 for clarity's sake.

The roller set 97 comprises a plurality of parallel idler rollers 99 the axles of which are fitted between the slanting bars 100.

The displaceable roller 98 is fitted between the arms 101 which are movably mounted at point 102. Springs, not illustrated in the figure, maintain the arms 101 in upward position.

When the cassette 16 has been removed by the suction member 8 from the supply device starting from the position 70 as indicated in FIG. 1, and has been positioned almost horizontally in the light-tight housing 1, the roller 98 has been pressed downwardly by the back-side of the cassette from the highest position 105, shown by the broken lines, into the downward position as shown by the full lines.

The vacuum in the suction member 8 is maintained during the entire period of the above described operations so that the cassette remains immobile.

As aforesaid, for ejecting the cassette, however, the vacuum is removed from the suction member. Hence, the cassette is no longer restrained, and under the influence of springs (not shown) the arms 101 will swing upwardly. The roller 98 presses one side of the cassette 16 upwardly so that the cassette will take a position 103 as indicated by the broken lines. By the force of gravity the loaded cassette then rolls over the roller set 97 in the direction of the arrow 104 and leaves the housing 1 through the opening 106. The cassette is received in a holder from which it can be removed when needed. If desired, a selection station can be provided for conveying cassettes of different size into separate holders. Means are provided for closing the opening 106 light-tight during the loading and unloading of the cassette in the housing 1.

The housing 1 still comprises an optical system for projecting the data of the identification ticket in the holder 63 of the cassette lid 19 onto the film sheet removed from the cassette.

In this way each risk of error in identifying the film sheets when leaving the processing device is excluded. A device which is appropriate for this treatment is disclosed among others in our Belgian patent specification 606,233.

When the dispensed film sheet has left the housing 1 and is guided to the processing device and after the reloaded cassette has been ejected, the supplying device is ready for another operation. Meanwhile the chain of the supplying device 5 has already made a further movement till a new cassette has taken the position 70. The shutter 6 is reopened and the operational cycle is repeated.

It has to be recalled that the center line of each cassette remains in the same plane once the cassette is hung on one of the hooks 61. So, when taking the horizontal position in the housing 1 the cassette is always centered. Since the lock member of each cassette is situated at the same level at the cassette, it will always be located at the same distance from the wall 4, irrespective of the size of the cassette, when the cassette is laid in the horizontal position in the housing 1.

The position of the lock member of the cassette when it is deposited in the housing 1 is thus accurately predetermined, and the step of gripping and unlocking the lock member 18 by the hook 72 offers no difficulties.

The present invention is not limited to the described embodiment. It is clear to one skilled in the art that other embodiments can be considered in the gripping system for removing the cassette from the supply means. Further also other mechanisms are possible for displacing the hooks, etc.

What we claim is:

1. Apparatus for automatically handling film sheet cassettes, in particular cassettes containing exposed X-ray film sheets, comprising a plurality of hook means arranged to carry one cassette each, means for supporting and displacing the hook means over a rectilinear course in a substantially horizontal direction and for returning the hook means at the end of their course to the starting point of said course, means for gripping the cassettes at the end of said course, for lifting them from the hook means and for transferring them into a light-tight closed cabinet, and within the reach of means for opening and closing the cover of the cassette, means for thereupon removing the exposed film from the cassette and conveying it to a developing means, a plurality of storage means for different sized X-ray films, means for inserting the proper-sized X-ray film into the cassette, and means for moving the reloaded cassette out of the cabinet.

2. Apparatus according to claim 1, wherein the means for supporting and displacing the hook means comprises a link conveyor chain which runs over a pair of horizontally spaced cog wheels which are located in a vertical plane, each link of the conveyor chain being provided with one hook means arranged for carrying one cassette and a pin connecting each pair of adjacent chain links being provided at both its extremities outside the links with a small roller adjacent to the links, and two spaced parallel U-shaped rails arranged to guide the said small rollers of the lower chain path rectilinearly between the two cog wheels.

3. Apparatus according to claim 2, wherein the U-shaped rails extend as far as under the shaft of each of the cog wheels, and in which the shaft of each cog wheel is vertically displaceable over a distance which is at least equal to the sagitta of the arc of the pitch circle of each cog wheel, which arc extends between two consecutive cogs.

4. Apparatus according to claim 2, wherein the cog wheel at the starting point of the course is also horizontally displaceable and is spring-biased in a direction away from the other cog wheel, so as to tighten the chain.

5. Apparatus according to claim 4, wherein the cog wheel mounted at the end of the course is provided with four cogs.

6. Apparatus according to claim 2, wherein each link of the chain is provided with a horizontal guide member extending transversely at either side of the hook and upward thereof, the distance between successive guide members being slightly greater than the thickness of one cassette.

7. Apparatus according to claim 1, wherein the means for gripping the cassette at the end of the course comprises an arm which at one end is provided with a suction member and which is mounted at the other end for pivoting around a horizontal axis normal to the extended rectilinear course followed by the cassettes, and which is capable of pivoting about 90 degrees, so that the lever in its first extreme position, wherein the suction member lies against the flat back side of the cassette at the end of its course, is capable of gripping the cassette, and in its second extreme position puts the cassette in a substantially horizontal position and centered with respect to, and within the reach of, the mechanisms for removing the exposed film sheets, for reloading the cassette with the proper unexposed film sheets, and for moving the reloaded cassette out of the cabinet.

8. Apparatus according to claim 7, wherein the mechanism for moving the reloaded cassette out of the cabinet comprises a sloping roller conveyor which is provided with a plurality of free-turning parallel rollers, and at least one other roller which is vertically displaceable beside the top roller of the said conveyor and which is sufficiently spaced therefrom to permit the arm to pass between said rollers when pivoting into its second extreme position to bring the cassette into a substantially horizontal position, said at least one other roller being spring-biased to lift the cassette when the vacuum in the suction member is removed, in order to tip it over the upper roller of the conveyor so that the cassette can slide downwardly over the other rollers of the conveyor.

References Cited
UNITED STATES PATENTS 3,111,585    11/1963    Sano et al.    250—66
3,150,263    9/1964    Catlin    250—66

WILLIAM F. LINDQUIST, *Primary Examiner.*

RALPH G. NILSON, *Examiner.*